Patented Aug. 28, 1934

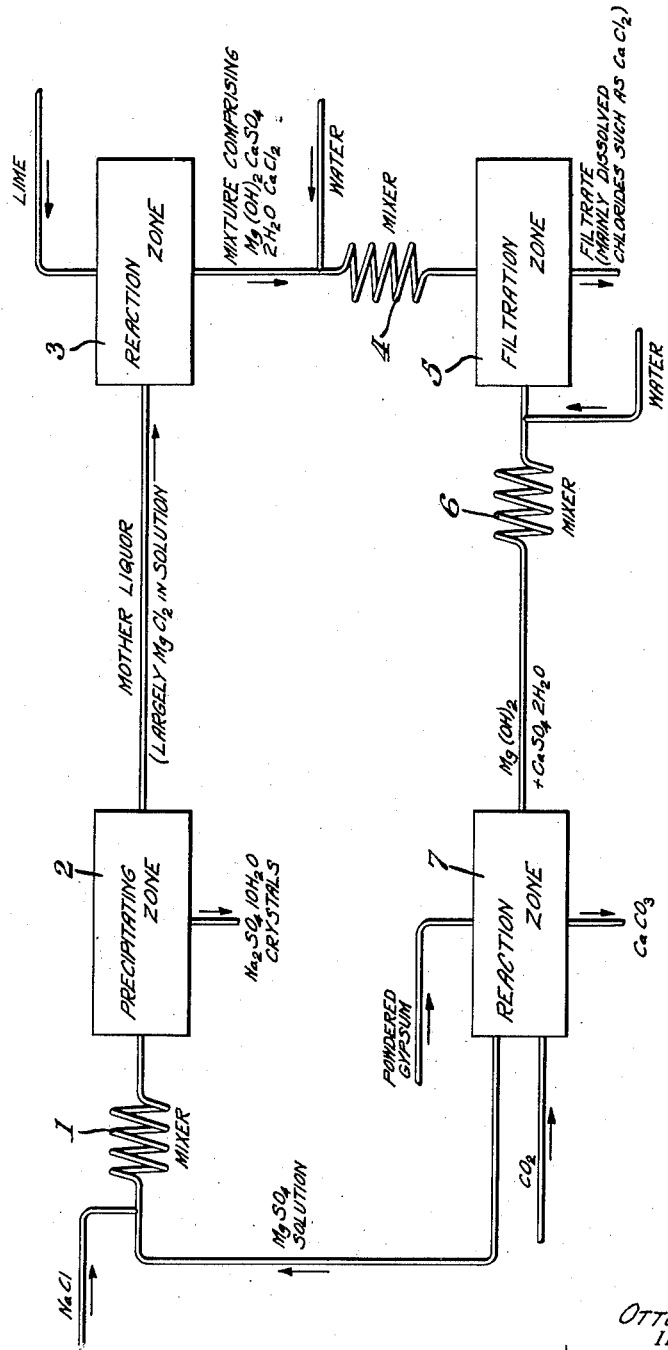

1,971,754

UNITED STATES PATENT OFFICE 1,971,754

MANUFACTURE OF SODIUM SULPHATE

Otto V. Martin, Tulsa, Okla., assignor to Texaco Salt Products Company, New York, N. Y., a corporation of Delaware Application September 16, 1932, Serial No. 633,458

6 Claims. (Cl. 23—121)

This invention relates to the manufacture of sodium sulphate and more particularly to the preparation of sodium sulphate from common salt and calcium sulphate.

The invention broadly contemplates the preparation of sodium sulphate by reacting common salt or sodium chloride with magnesium sulphate solution under suitable conditions of temperature and concentration to precipitate sodium sulphate and continuously re-forming the magnesium sulphate solution for reaction with further sodium chloride. The magnesium sulphate solution is re-formed by treating the mother liquor remaining after removal of the precipitated sodium sulphate with lime to produce a slurry composed largely of magnesium hydroxide, treating this slurry with calcium sulphate in the presence of carbon dioxide and removing the resulting insoluble matter to produce a solution composed largely of magnesium sulphate and which is adapted for reacting with further sodium chloride.

The invention also contemplates the preparation of certain intermediate products resulting during the foregoing steps, as, for example, chlorides of calcium and magnesium.

Sodium sulphate in the form of Glauber's salt has been prepared in the past by reacting sodium chloride with Epsom salts but this method is dependent upon the availability of a cheap source of supply for magnesium sulphate, as, for example, in the form of waste from the potash industry. Other methods involve the recovery of sodium sulphate from natural deposits or from naturally occurring brines which contain the salt in solution, such, for example, as the brines obtained from Searles' or Owen's Lakes in California.

My invention provides a method of preparing sodium sulphate from raw materials which are generally and readily available at relatively low cost in many localities. The invention is of particular advantage in connection with the utilization of common salt recovered from natural brines, particularly oil field brines and the like.

In accordance with my invention, common salt obtained from these latter sources is mixed with a brine solution containing a substantial amount of magnesium sulphate and the resulting mixture cooled to around 20° F. to precipitate the sodium sulphate in the form of Glauber's salt. The magnesium sulphate solution is cyclically re-formed by treating the mother liquor resulting from this operation with lime to produce a precipitate or slurry composed largely of magnesium hydroxide. This precipitate is removed and after washing is then treated with calcium sulphate, or gypsum, in powdered form in the presence of carbon dioxide. The insoluble matter remaining in the mixture and consisting largely of calcium carbonate is removed leaving a solution sufficiently rich in magnesium sulphate to react with sodium chloride for the production of further sodium sulphate.

The mother liquor might be treated with alkaline materials other than lime, but the latter is of advantage since it can be recovered as the carbonate. Thus the calcium carbonate resulting above may then be decomposed by heating or burning to form lime and carbon dioxide, which is suitable for reuse in treating further solution.

In carrying out the invention an aqueous mixture of common salt and Epsom salts is initially used. Common salt, sodium chloride, and Epsom salts are advantageously mixed together in substantially molecular proportions to form a saturated solution. This mixture is then cooled to a temperature of 28° F. or possibly to lower temperatures, as, for example, around 15° F. at which temperature it may be held for about twenty-four hours.

This operation may be carried out in ordinary ice plant equipment, the solution being cooled in cans such as are commonly used in the production of ice. At the end of the cooling period the cans are pulled in the ordinary manner, the mother liquor being poured off and the sodium sulphate crystals containing 10 molecules of water are later dumped from the bottom of the cans. The following equation is believed to illustrate the reaction between the common salt and Epsom salts to produce sodium sulphate:

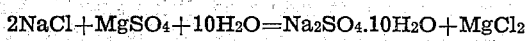

$2NaCl + MgSO_4 + 10H_2O = Na_2SO_4.10H_2O + MgCl_2$

In balanced plant operations, the sodium chloride is mixed with magnesium sulphate solution obtained by regenerating the mother liquor in a manner which will be more fully described. Reference may be made to the accompanying flow diagram for the purpose of describing a balanced operation.

Sodium chloride is mixed in the proper proportions with regenerated magnesium sulphate solution during passage through a mixer 1. The resulting mixture is then conducted to a precipitating zone 2 wherein the mixture is cooled to around 20° F. and allowed to settle to bring about precipitation of the sodium sulphate crystals.

The mother liquor resulting from this step is composed largely of magnesium chloride with small amounts of dissolved common salt, sodium sulphate, and Epsom salts. This liquor is conducted to a reaction zone 3 wherein it is treated with enough lime to precipitate dissolved magnesium salts and other compounds as magnesium hydroxide and calcium sulphate probably in accordance with the following chemical equation:

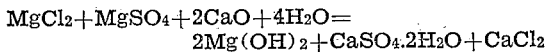
$$MgCl_2 + MgSO_4 + 2CaO + 4H_2O = 2Mg(OH)_2 + CaSO_4.2H_2O + CaCl_2$$

The precipitate formed above will also contain some calcium sulphate. The precipitate which can be removed by filtration may then be re-pulped with water in a mixer 4 and filtered in a filtration zone 5 to separate the insoluble magnesium hydroxide, $Mg(OH)_2$, and calcium sulphate, $CaSO_4.2H_2O$, from the soluble calcium chloride.

The foregoing calcium chloride solution is removed from the system and may be separately processed to recover the calcium chloride, as, for example, after the manner described in my co-pending application, Serial No. 483,992 for "Anhydrous metallic chlorides and their preparation", filed September 24, 1930, now Patent 1,877,733.

The precipitate recovered in the foregoing filtering operation is now mixed with water in a mixer 6 from which it is conducted to a reaction zone 7 wherein it is mixed with finely ground gypsum, $CaSO_4.2H_2O$, in substantially molecular proportions and water added to form an aqueous suspension. Sufficient water may be added, for example, so that when all the magnesium has been converted to magnesium sulphate the concentration will be about 7% magnesium sulphate.

This suspension is then carbonated by agitating and blowing with $CO_2$ or with flue gas or some other gas containing $CO_2$. The carbonation step may be illustrated by the following chemical equation:

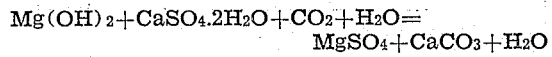
$$Mg(OH)_2 + CaSO_4.2H_2O + CO_2 + H_2O = MgSO_4 + CaCO_3 + H_2O$$

The magnesium sulphate remains in solution while the calcium carbonate is precipitated. The mixture is therefore filtered to separate the insoluble matter and leave a re-formed magnesium sulphate solution which is returned to the precipitating zone 2 for reaction with further sodium chloride.

This magnesium sulphate solution may contain appreciable quantities of dissolved carbon dioxide which is expelled either by heating or preferably by blowing with steam or some other inert gas. The solution is then advantageously subjected to evaporation to remove excess water following which it is in a condition suitable for mixing with sodium chloride for the production of further Glauber's salt.

If desired the evaporation may be carried out subsequently to the mixing with the sodium chloride. This evaporation may be effected by spraying the warmed mixture into the atmosphere as described in my pending application Serial No. 475,270, for the "Recovery of salts and other products from oil field brines" filed August 14, 1930.

The calcium carbonate removed in the previous filtering operation is subjected to burning to decompose it into lime and carbon dioxide. These materials are returned to the system for reuse in re-forming further magnesium sulphate solution.

Thus the only new ingredients used, other than those which may be lost during processing, are common salt and calcium sulphate in the form of gypsum.

In addition to the production of sodium sulphate, as well as calcium chloride as the end products, intermediate products may also be recovered, for example magnesium chloride. If such intermediate products are removed additional raw materials must be added as make-up, for instance if magnesium chloride were recovered additional magnesium hydroxide or Epsom salts would have to be introduced to the system to supply the magnesium.

The crystals of sodium sulphate containing 10 molecules of water as produced in the foregoing process may be disposed of as such after drying or draining in any suitable manner or they may be subjected to dehydration for the production of anhydrous salt. The dehydration may be effected by heating and dissolving the crystals in their own water of dehydration and salting out by the addition thereto of common salt. It is not essential that this particular method be followed since other means may be adopted for preparing the anhydrous salt such as by exposing to sufficiently high temperatures.

Obviously many modifications and variations of the invention, as hereinbefore set forth, may be made without departure from the spirit and scope thereof, and therefore only such limitations should be imposed as are indicated in the appended claims.

1. The method of preparing sodium sulphate from sodium chloride and calcium sulphate comprising reacting sodium chloride with magnesium sulphate solution to precipitate sodium sulphate, removing the precipitated sodium sulphate, re-forming the magnesium sulphate solution by treating the mother liquor remaining after removal of the precipitated sodium sulphate with lime to produce therefrom a slurry composed largely of magnesium hydroxide and treating said slurry with calcium sulphate in the presence of carbon dioxide to thereby produce a solution which after removal of insoluble compounds is composed substantially of magnesium sulphate, and returning the re-formed solution for reaction with further sodium chloride.

2. The method of preparing sodium sulphate from sodium chloride and calcium sulphate comprising initially mixing sodium chloride and Epsom salts in substantially molecular proportions to form a saturated solution, cooling the solution to precipitate sodium sulphate, removing the precipitated sodium sulphate, treating the mother liquor with lime to produce therefrom a slurry composed largely of magnesium hydroxide, treating said slurry with calcium sulphate in the presence of carbon dioxide, removing the resulting insoluble compounds to thereby produce a re-formed magnesium sulphate solution and reacting this re-formed solution with further sodium chloride to produce sodium sulphate.

3. The method of preparing sodium sulphate from sodium chloride and calcium sulphate comprising initially mixing sodium chloride and Epsom salts in substantially molecular proportions to form a saturated solution, cooling the solution to precipitate sodium sulphate, removing the precipitated sodium sulphate, treating the mother liquor with lime to produce therefrom a slurry composed largely of magnesium hydroxide, treating said slurry with calcium sulphate in the presence of carbon dioxide, removing the resulting insoluble compounds to thereby produce a re-formed magnesium sulphate solution, mixing further sodium chloride with this re-formed solution, evaporating excess water therefrom and cooling the mixture to precipitate sodium sulphate.

4. The method of preparing sodium sulphate from sodium chloride and calcium sulphate which comprises cyclically preparing a brine solution containing magnesium chloride, reacting the solution with lime to form a precipitate composed largely of magnesium hydroxide, removing the precipitate from its mother liquor, forming an aqueous suspension of this precipitated material, carbonating the resulting suspension in the presence of finely ground gypsum to form magnesium sulphate in solution, removing insoluble material, adding sodium chloride to the magnesium sulphate solution in substantially molecular proportions to form a saturated solution, cooling the mixture to precipitate sodium sulphate crystals, and returning the mother liquor composed largely of magnesium chloride in solution for re-treatment with lime.

5. The method of preparing sodium sulphate from sodium chloride and calcium sulphate which comprises cyclically preparing a brine solution containing magnesium chloride, reacting the solution with lime to form a precipitate composed largely of magnesium hydroxide, removing the precipitate from its mother liquor, mixing powdered calcium sulphate with the precipitated material in substantially molecular proportions, agitating the mixture while in aqueous suspension with carbon dioxide containing gas to convert the magnesium hydroxide to the sulphate in solution, removing insoluble material, mixing sodium chloride with the magnesium sulphate solution in substantially molecular proportions to form a saturated solution, cooling the mixture to a temperature at which sodium sulphate crystals are precipitated and returning the mother liquor composed largely of magnesium chloride in solution for re-treatment with lime.

6. The method of preparing sodium sulphate from sodium chloride and calcium sulphate which comprises cyclically preparing a brine solution containing magnesium chloride, reacting the solution with lime to form a precipitate composed largely of magnesium hydroxide, removing the precipitate from its mother liquor, mixing powdered calcium sulphate with the precipitated material in substantially molecular proportions, agitating the mixture while in aqueous suspension with carbon dioxide containing gas to convert the magnesium hydroxide to the sulphate in solution, removing insoluble material, evaporating the solution to remove excess water, mixing sodium chloride with the magnesium sulphate solution in substantially molecular proportions to form a saturated solution, cooling the mixture to a temperature at which sodium sulphate crystals are precipitated and returning the mother liquor composed largely of calcium chloride in solution for re-treatment with lime.

OTTO V. MARTIN.